(12) United States Patent
Lowes

(10) Patent No.: US 10,987,963 B2
(45) Date of Patent: Apr. 27, 2021

(54) PRINTING PLATE CELL PATTERNING

(71) Applicants: SANDON GLOBAL ENGRAVING TECHNOLOGY LTD, Runcorn (GB); REPROFLEX3 LIMITED, Cramlington (GB)

(72) Inventor: Trevor Lowes, Cramlington (GB)

(73) Assignees: SANDON GLOBAL ENGRAVING TECHNOLOGY LIMITED, Runcorn (GB); REPROFLEX3 LIMITED, Cramlington (GB)

( * ) Notice: Subject to any disclaimer, the term of this patent is extended or adjusted under 35 U.S.C. 154(b) by 345 days.

(21) Appl. No.: 16/085,673

(22) PCT Filed: Mar. 9, 2017

(86) PCT No.: PCT/EP2017/055563
§ 371 (c)(1),
(2) Date: Sep. 17, 2018

(87) PCT Pub. No.: WO2017/157756
PCT Pub. Date: Sep. 21, 2017

(65) Prior Publication Data
US 2019/0111721 A1    Apr. 18, 2019

(30) Foreign Application Priority Data
Mar. 17, 2016    (GB) ..................... 1604532

(51) Int. Cl.
*B41N 1/12*    (2006.01)
*B41N 1/22*    (2006.01)
(Continued)

(52) U.S. Cl.
CPC ................. *B41N 1/12* (2013.01); *B41N 1/22* (2013.01); *H04N 1/4057* (2013.01); *H04N 1/52* (2013.01)

(58) Field of Classification Search
CPC .... B41C 1/05; B41F 5/24; B41M 1/04; B41N 1/12; B41N 1/22; H04N 1/52; H04N 1/405; H04N 1/4057
See application file for complete search history.

(56) References Cited

U.S. PATENT DOCUMENTS 8,654,400 B2    2/2014  Cave
8,654,401 B2    2/2014  Cave
(Continued)

FOREIGN PATENT DOCUMENTS

DE    102012006558 A1    10/2013
JP    2006240283 A    9/2006
WO    2010077274 A1    7/2010

OTHER PUBLICATIONS

International Search Report for PCT/EP2017/055563, dated Jun. 20, 2017.
Written Opinion for PCT/EP2017/055563, dated Jun. 20, 2017.

*Primary Examiner* — Matthew G Marini
*Assistant Examiner* — Marissa Ferguson-Samreth
(74) *Attorney, Agent, or Firm* — John H. Choi & Associates LLC

(57) ABSTRACT

A printing plate includes a plurality of relief areas which stand proud of a floor of the plate, each of the relief areas having an uppermost surface to which, in use, is applied a liquid which is borne by the uppermost surface and subsequently contactingly transferred to a substrate material. A predetermined pattern of depressions define a corresponding pattern of islands within the uppermost surface. The depressions within the uppermost surface include at least primary depressions of a first size and substantially geometric first cross-sectional shape, and secondary depressions, being of smaller cross-sectional area than the primary depressions and having a second cross-sectional shape which is distinctly more elongate than the first cross-sectional shape.

20 Claims, 5 Drawing Sheets

(51) Int. Cl.
*H04N 1/405* (2006.01)
*H04N 1/52* (2006.01)

(56) References Cited

U.S. PATENT DOCUMENTS

| | | |
|---|---|---|
| 9,235,126 B1 | 1/2016 | Bielak |
| 2002/0083855 A1 | 7/2002 | Samworth |
| 2002/0152911 A1 | 10/2002 | Weichmann |

PRINTING PLATE CELL PATTERNING

CROSS-REFERENCE TO RELATED APPLICATION

This application claims priority to PCT Application No. PCT/EP2017/055563, filed on Mar. 9, 2017, which claims priority to GB1604532.0, filed Mar. 17, 2016, each of which is incorporated by reference in its entirety.

FIELD OF THE INVENTION

The present invention relates to improvements in printing plate cell patterning, particularly to cell patterns applied to and appearing in flexographic printing plates, such cell patterns commonly being applied over a proportion or the entirety of the surface of the ink-bearing relief portions of such plates.

Although the following description is provided with almost exclusive reference to flexography and the plates (or sleeves) adapted for use therein, it should be understood that the present invention may have wider application. Indeed, the invention may find application to any plate provided with relief features which are adapted, in use, to receive and bear a liquid so that said liquid effectively uniformly coats the surfaces of said relief features immediately prior to being transferred to a substrate material which is caused to come into contact with that liquid coating and which will typically have at least some affinity for, and thus receive said liquid. As will become apparent from the following description, particularly in flexographic printing applications, the provision of a surface cell pattern in the liquid-bearing surfaces of such relief features can improve the efficacy, uniformity, consistency and precision of the plate-to-substrate liquid transfer process.

BACKGROUND OF THE INVENTION

Flexography is a well-known and very widely practiced printing technique, and, in rotary presses, entails the use of a flexible relief plate usually mounted on a rotating cylinder and to which, with each (or every other) rotation of the cylinder, a precisely measured amount of a printing ink is applied. The print cylinder rotates into contact with a web of substrate material, most commonly fed into a nip defined by the plate cylinder on one hand, and an impression cylinder on the other, and the ink is thus transferred to the substrate. Although there have been advances in all aspects of flexography over the years, for example in flexographic printing inks, ink doctoring and metering systems, substrate materials, and in the various techniques for ensuring precise registration of printing plates and the substrate materials they come into contact with, arguably most fundamental components of any flexographic printing system are the printing plate itself, and the Anilox rolls which apply the ink in a precise, consistent and uniform manner to the relief surfaces of said plate. Although a complete description of Anilox rolls is beyond the scope of this application, the skilled reader will nonetheless understand that the precisely uniform, consistent and even layer of ink they apply to the printing plate is a critical factor in determining the overall quality of print achieved by any flexographic printing press.

The manufacture of flexographic printing plates is a necessarily precise, intricate and involved process, not least because the quality of the printing plate, and the precision and accuracy of the relief features within it, are fundamental factors in determining the resulting print quality because it is the proudmost surfaces of the relief features that receive and retain the ink, usually being of one of the standard printing colors of Cyan (C), Magenta (M), Yellow (Y) and Black (K), before contact with the substrate results in transfer of the ink thereto. For background purposes, one flexographic printing plate manufacturing technique is described below.

Initially, there is a requirement for the creation, nowadays almost universally done using a computer, of source artwork, being an image which it is desired to print repeatedly on the substrate material. This image will commonly be created in, or imported (in the case of source photographic material, whether digitally captured or not) into some form of desktop publishing (DTP) software (e.g. Adobe® InDesign®, Illustrator®, Photoshop® etc.). The source artwork image, being digital and possibly being represented in vector form, typically utilizes an extremely extensive color palette ($>16 \times 10^6$ colors is common), and is, at least in its original format, completely unsuitable for any large-scale printing technique such as flexography, and therefore significant amounts of pre-processing of the artwork image are required. The main aim of such pre-processing is to convert the original digital image into (at least) four separate images consisting of patterns of dots, solid color areas and voids or "non-dots", each of the four separate images being essentially the same size as the original digital artwork image and corresponding to one of the primary CMYK printing colors so that if all four images were superposed, the dots, solid areas and non-dot areas of each separate image would combine visually to recreate the original artwork image, at least to an extremely good approximation and without any discrepancy discernible by the naked eye. This technique is known as screening, and further explanation will be provided below, but for the purposes of this introduction, it is sufficient for the skilled reader to understand that each of the separate screened images is the primary precursor in creating the corresponding (CMYK) flexographic printing plate.

The flexographic plate itself is usually comprised of a flexible sheet of ultra-violet (UV), laser-light or otherwise (e.g. thermally, chemically) curable elastomeric polymer or photopolymer material (e.g. Flexcell NX Flexographic Media available from Eastman Kodak Inc.). As a first step in the manufacture of a printing plate, the back of the plate may be uniformly exposed to UV light so as to provide the plate with a stable base and establish the plate floor. Thereafter, a light sensitive film is selectively exposed using the desired (CMYK) image separation derived from the screening process described above so that the exposed film so created is essentially a negative of the desired CMYK image, and this film is then laminated to the top of the printing plate, i.e. on the opposite side to that forming the base and already having been cured by UV light. A further UV exposure is then conducted whereby the remainder of the plate is exposed to UV light through the film, which thus acts as a mask or barrier and therefore only the positive desired areas of the plate are exposed, and thus cured. After an appropriate exposure time, the film is removed, and the plate is washed with a solvent so as to wash away the unexposed/uncured plate material. Optionally, the plate may then be uniformly re-exposed to harden the plate, and thereafter, the plate is subjected to a carefully controlled drying process to remove as much of the solvent as possible. It is worth noting that the intensity of the exposure decrease as the illumination penetrates the plate because of absorbers added to the plate material. Once the intensity drops below a threshold value, there is insufficient cross-linking in the polymer comprising the plate and the remaining under-exposed polymer can be washed away. This is usually the top 0.5 mm of the plate. The result is a flexible printing plate in which various relief areas are defined having inclined shoulders which descend downwardly from the proudmost surfaces of the relief areas towards the plate floor. To provide some indication of the smallest practical stable relief features currently achievable utilizing this process, a single relief feature may correspond to a halftone dot (i.e. a dot in one of the abovementioned CMYK screen images, such being known as halftone dots because they represent something other than a solid color area or "full tone") of less than about 3% tonality at 2400 dots per inch (DPI). For broadly circular dots, this may be equivalent to a dot diameter of approximately 30 μm.

For some years now, it has been known that improved ink transfer characteristics (e.g. density, evenness of ink laydown, and reduction of common undesirable print artefacts such as tail-edge void and reticulation) can be achieved by applying a surface pattern to the ink-bearing surfaces of printing plate relief areas. For example, it is possible to digitally modify one or more of the individual halftone CMYK screen images so that larger (if not all) areas of the image have a pixel mask pattern, such as a stretched checkerboard-type pattern of rectangles measuring approx. 5 μm×10 μm, applied to them so that the ink-bearing surfaces of the relief areas of the ultimately created printing plate have a corresponding checkerboard-type pattern of tiny islands formed therein and which are surrounded by intervening depressions which together form microscopically shallow channels around the islands. By providing such plate cell patterning, as it is commonly known, users have reported significant increases in average ink densities on printed substrates, particularly for the Cyan, Magenta and Black screens, together with noticeable improvements (though not as large) in the Yellow ink densities, together with increased uniformity of ink-laydown for all screens. Naturally, the overall quality, in terms of visual appearance, of the printed substrate are correspondingly significantly improved, most probably as a result of the tendency of the ink applied to a patterned cell surface to disperse to a certain degree and thus become more evenly distributed over said surface. Also, and somewhat counter-intuitively, plate cell patterning can result in a reduction of the quantity of ink required to achieve these enhanced effects—whereas it would generally be anticipated that a greater ink density in the printed substrate would require a greater quantity of ink to be transferred to the substrate, in practice it seems that the converse is true.

This latter phenomenon can sometimes be attributed to the particular type of screening applied in the creation of each (CMYK) of the halftone screen separations. Currently, the most common types of screening include:

Amplitude modulation (AM) Screening (wherein dots appearing within the screen image are generally arranged in a regular array or fixed grid but vary in size depending on the tonal value required in a particular area of the resulting printed image; (tonality is usually expressed as a percentage between 5%-95%; tonality below 5% cannot be discerned by the naked eye, and dot gain effects on tonal values above 95% usually result in 100% tonality in practice);

Concentric screening (CS) is a modified version of AM screening wherein the dots are replaced with concentric rings of comparable size to the conventional dot;

Frequency Modulated (FM) or Stochastic screening, where the dot size remains consistent but their frequency of appearance or density in any particular cell (being an arbitrary square area within the image) varies depending on required tonality;

Cross modulated (XM) screening, essentially a combination of FM and AM screening technologies at differing screen percentage values, and (more recently)

Digitally Modulated (DM) screening, wherein each and every pixel in a relevant screen is digitally modulated, depending on the tonality of surrounding areas of the screen, so as to be only horizontally or vertically, but not diagonally, adjacent to another pixel; such digital modulation occurs as part of the digital creation process of the digital binary 1-bit Tagged Image Format (TIF) file which provide the primary precursors for computer-to-plate (CTP) print manufacturing techniques; DM screening is described in more detail in U.S. Pat. No. 8,654,400 & U.S. Pat. No. 8,654,401, but in brief, the on/off value of each and every pixel is carefully controlled, and this is alleged to provide far better results than merely repeating a fixed pattern of dots (AM screening) or randomly marking pixels within a particular cell according to some stochastic or frequency-based requirement (as in FM screening); DM screening claims to provide unprecedented quality of screening, which is easy to plate and print using any CTP device, but applicants herefor have found it largely impossible to substantiate such claims in print using conventional CTP manufacturing techniques.

For other prior art relevant to the present invention, the reader should also have recourse to: WO2010/077274 in the name of Eastman Kodak Company (patterning of relief features in a printing plate), US2002/0152911 to Weichmann (method of varying the ink density of the full tone by superimposing a basic raster on a fine microraster), US2002/0083855 to Samworth (method for producing a printing plate having both solid and halftone areas comprising ink cells where a first type of cell patterning is applied in the solid areas, and a second pattern with different density and size of cells is applied to a selection of the halftone dots in the halftone areas), and U.S. Pat. No. 9,235,126 to Bielak (detecting an edge and interior regions of image features in a halftone image and applying a fine pixel mask pattern to the edge regions and a coarse pixel mask to the interior regions).

Despite the advances in both screening techniques and plate cell patterning, there is nevertheless still room for improvement, particularly as regards the printing of solid colors, or of shadows having high tonal values, because the screening techniques described do not translate particularly well to the areas of the printing plate where relatively high densities of dots (or, in the digital domain in a digital screen separation image, "on" pixels constituting them) are required in order to print them. The deficiencies of solid color printing are manifested in the well known issues of tail edge void, fluting and reticulation, often easily seen through a loupe in solid printed areas, and it is believed that a number of factors can contribute to the appearance of these undesirable phenomena, e.g., dot gain, air entrapment, ink viscosity and ink/substrate interaction or affinity. Of these, perhaps the most important are dot gain, namely the extent to which a dot of ink borne by a single isolated relief area on a printing plate inevitably enlarges as a result of being effectively squashed onto the substrate material as both substrate and ink globule are nipped between the print cylinder and the impression cylinder, and the entrapment of air within ink globules, in particular as a result of the effective seal that is created between the peripheral edges of an ink globule and the substrate material as it is deformed through contact with the substrate material.

It is therefore an object of this invention to provide a printing plate in which relief areas are provided, the surfaces of which are provided with a surface cell pattern which results in their being able to accept and transfer ink to a substrate material in a more reliable, consistent and uniform manner, such that the known issues of tail edge void and reticulation are practically eliminated, particularly in those relief areas of the plate adapted for the printing of solid colours or shadows having relatively high tonal values.

It is a further object of the invention to provide a method of printing plate manufacture, and in particular a method of surface cell patterning of relief areas of such a printing plate. A yet further object of the invention is a method of creating a binary or 1-bit TIF (or other raster or non-raster format) image primary precursor used in the manufacture of such a printing plate.

SUMMARY OF THE INVENTION

According to the present invention there is provided a printing plate in which a plurality of relief areas are provided which stand proud of a floor of the plate, each of said relief areas having an uppermost surface to which, in use, is applied a liquid which is borne by said uppermost surface and subsequently contactingly transferred to a substrate material, the uppermost surface of one or more of said relief areas being pitted in that substantially the entire uppermost surface of said relief area is provided with a predetermined pattern of depressions which define a corresponding pattern of islands within said uppermost surface, characterized in that the depressions within the uppermost surface comprise at least primary depressions of a first size and substantially geometric first cross-sectional shape, and secondary depressions, being of smaller cross-sectional area than said primary depressions and having a second cross-sectional shape which is distinctly more elongate than said first cross-sectional shape, and further characterized in that the primary depressions are arranged substantially diagonally with respect to one another and in substantially continuous rows having a lateral separation which is at least three times a lateral dimension of the first cross-sectional shape, said secondary depressions also being arranged substantially diagonally with respect to one another and in rows, but the rows of the secondary depressions are orientated at a different diagonal angle to those of the primary depressions and are discrete in that their terminal depressions lie within consecutive rows of the primary depressions so as to define a corresponding pattern of islands of different sizes and diagonal orientations.

The present applicants have discovered that relief printing plates having this unusual "multi-angular" surface cell patterning applied to them, in particular to the relief areas on the plates which are adapted to print solid colors or shadows having larger tonal values produce results in print which are nothing short of spectacular. In particular, common print deficiencies such tail-edge void, fluting and reticulation are almost completely eliminated, and what results is an extremely even ink lay-down with practically no discernible artefacts, even when the printed substrate is viewed through a loupe. Furthermore, preliminary print results produced with plates according to the invention have exhibited excellent ink densities, measured using a standard densitometer, of 1.4 and above. In some cases, densitometer measurements have been witness as high as 2, a density measurement heretofore unprecedented in commercial printed material.

Preferably, the cross-sectional shapes of either or both the primary and secondary depressions are regular polygons, preferably quadrangular, further preferably rectangular or diamond-shaped (i.e. in the shape of a parallelogram). In a most preferred embodiment, the cross-sectional shapes of the primary depressions is square, rectangular, or of diamond-shape having at least one axis of symmetry, and the cross-sectional shape of the secondary depressions is either rectangular with the elongate side of such rectangle being of substantially the same dimension as the corresponding side of one of the primary depressions, or of a diamond-shape wherein at least one of the major and minor axes of that shape is different from the corresponding axis of a diamond-shaped primary depression. In an alternative embodiment, the primary depressions cross-sectional shape may be circular or elliptical, and the secondary depression shape may be correspondingly elliptical, or elliptical with a major or minor axis differential as compared with the elliptical primary depression shape.

In a most preferred embodiment, the cross-sectional shape of a primary depression is substantially square having sides in the region of 10 μm, whereas the preferred cross-sectional shape of the secondary depression is substantially rectangular with side dimensions of 10 μm×5 μm.

Most preferably, where the geometric cross-sectional shapes of the primary and secondary depressions can be considered as having lateral and transverse axes and thus dimensions, each being of a geometric shape having the same number of sides, then at least one, if not both of the lateral and transverse dimensions of those cross-sectional shapes are mathematically related. In a most preferred embodiment, the lateral dimensions of both primary and secondary depressions cross-sectional shapes are equal, whereas the transverse dimension of a primary depression is (1+X) times the corresponding transverse dimension of a secondary depression, with X being in the range of 0.2-3, further preferably 0.5-2.

It is worth mentioning here that there is of course some natural manufacturing discrepancy between, on one hand, the highly precise, high resolution digital/binary 1-bit TIF files that are created as part of the screening and subsequent (or simultaneous) surface patterning processing of an original artwork image file, and on the other hand, the relief printing plate produced therefrom. Although manufacturing techniques have been steadily improving over the years, it is simply not possible to exactly replicate the digital 1-bit TIF image file in a printing plate to the extent that the patterns of islands and intervening depressions in the plate have exactly the same shape and dimensions as prescribed in the (purely virtual and digital) 1-bit TIF image. The skilled reader should therefore understand that while the text hereof attempts to define the cross-sectional shapes of depressions appearing within a patterning (and being commonly equivalent to white "off" pixels in the TIF raster image) applied to some or all of the relief areas of a printing plate, in practice there will be miniscule variations in both the cross-sectional shape and size of the islands, and also in their location and relative positioning. Nevertheless, a printing plate produced according to the invention will demonstrate, at least under close inspection, for example under an electron microscope, diagonally orientated, laterally separated rows of primary depressions (on either side of which corresponding rows of primary islands will be apparent), and between these diagonal rows of primary depressions/islands, much shorter rows of secondary depressions (and corresponding islands) will be apparent, also diagonal in orientation but of different inclination to the rows of primary depressions (and the corresponding islands resulting from the creation of those depressions).

Preferably, the surface cell patterning as prescribed above is applied only to areas of a digital screen image (and thus, in turn, to relief areas in a printing plate) having tonal values above a threshold value, for example 50%, or more preferably, 70%, and most preferably 90%). Further preferably, the respective areas of a digital screen image are only subjected to such surface cell patterning if they are larger than some threshold value based on the overall image size/area, for example greater than 5, 10, 15, or 20% of total image size/area. In alternative embodiments, it may be preferably to apply the surface cell patterning over the entirety of a digital screen image, or at least to any and all areas where it is likely to have some material effect, for example in all regions other than those representative of only highlights and/or midtones.

Most preferably, the pattern of depressions and corresponding islands applied to relief areas of a printing plate according to the invention results from the combination of two distinct raster image processing (RIP) steps, which may be conducted separately or which may be combined in a single processor-intensive digital RIP operation. The first such step is a DM screening RIP. When conducted in solid print image areas, or in areas having a high tonal value of a particular color, this RIP results in a patterning being applied in which, in every pixel row of the image, every fifth pixel (a greater or lesser multiplier may be used) is set to "off", meaning that this pixel would correlate to a single depression in the resulting manufactured printing plate. In each subsequent pixel row, again every fifth pixel is set to "off", but with an offset of one pixel, so that "off" pixels in the second row are arranged with their upper (top-left) vertices most proximate the lower (bottom-right) vertices of "off" pixels in the first row. The result of this arrangement of "off" pixels in the resulting manufactured printing plate is to create a diagonal channel because whereas, in the pixel-based TIF image "off" pixels only contact one another at their infinitesimally small vertices, in manufacture, such precision cannot be achieved and there is some inevitable coalescence of diagonally adjacent depressions, as will be understood by those skilled in the art.

Once an entire image has been processed in this manner, the resulting effect is repeating diagonally orientated rows of "off" pixels, with the lateral distance between each diagonal row of "off" pixels being consisted and uniform, i.e. pixels. After this first RIP has been conducted, a second further RIP is applied, but selectively in that the second RIP is applied only to the remaining "on" pixels in the image as provided after completion of the first RIP. The second RIP involves a simple (at least as compared to the DM RIP) stretched checkerboard pattern (previously mentioned and further described below) in which the pixels are rectangular with their longer (10 μm) edge parallel with the row length direction and with their shorter (5 μm) edges aligned with row edge and define the row width. The on/off status of any pixel in any row is the reverse of the on/off state of the previous pixel in that row, the on/off state of the first pixel in any row is the reverse of the on/off state of the first pixel in any previous or subsequent row, as in any conventional checkerboard pattern. Importantly however, in the second pattern, the diagonal angles formed between adjacent "off" pixels in consecutive rows is different from the corresponding diagonal angles formed between adjacent "off" pixels in consecutive rows of the first pattern. Preferably, the diagonal angle of the second pattern is shallower (measured clockwise from a lateral line drawn through any pixel row from right to left across the pattern, akin to the manner that screen angle is measured) than the corresponding diagonal or "screen angle" of the "off" pixels of the first pattern. This results from the pixels in the second pattern being distinctly more elongate in the lateral (row-length) direction than their counterparts in the first pattern, and means that a short diagonal rows of "off" pixels of the second pattern can be applied to the "on" pixels between and within any two of the consecutive diagonal rows of "off" pixels of the first pattern. The overall result is a "multiple angle" pattern of both "on" and "off" pixels, of differing sizes and cross-sectional shapes, and it is believed that this multiple angle patterning is fundamental in delivering the quality of print already seen from plates to which such patterning has been applied.

Further advantages, improvements and variations of the invention will become apparent from the following specific embodiment, now described by way of example and with reference to the accompanying drawings wherein.

DETAILED DESCRIPTION

Figure 1:
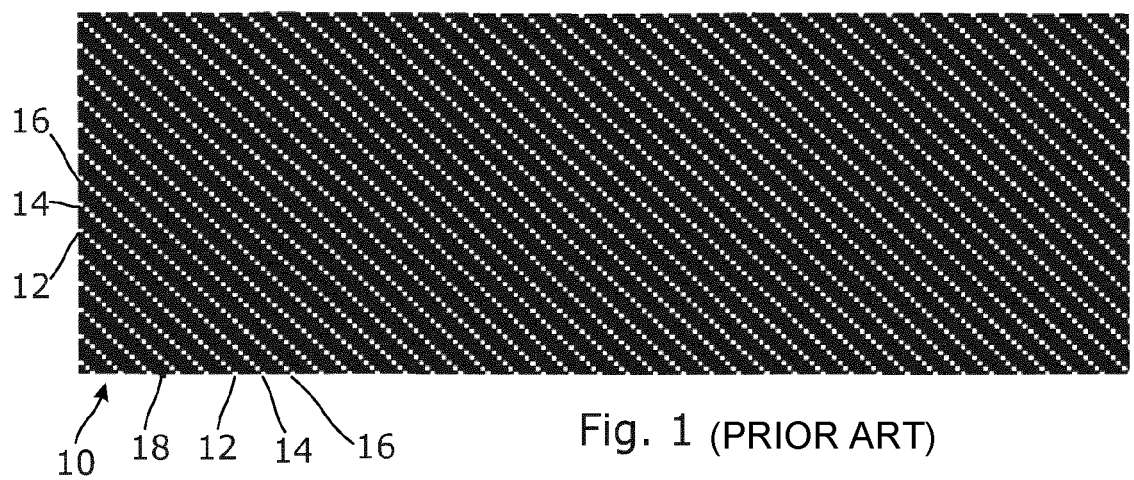
FIG. 1 shows an example of a known surface pattern pixel matrix obtained when a DM RIP is applied to an otherwise solid color area of a screening image wherein the black "on" pixels ultimately represent ink-bearing relief areas of a subsequently produce printing plate, and the white "off" pixels represent surface depressions in said relief areas.
Figure 5:
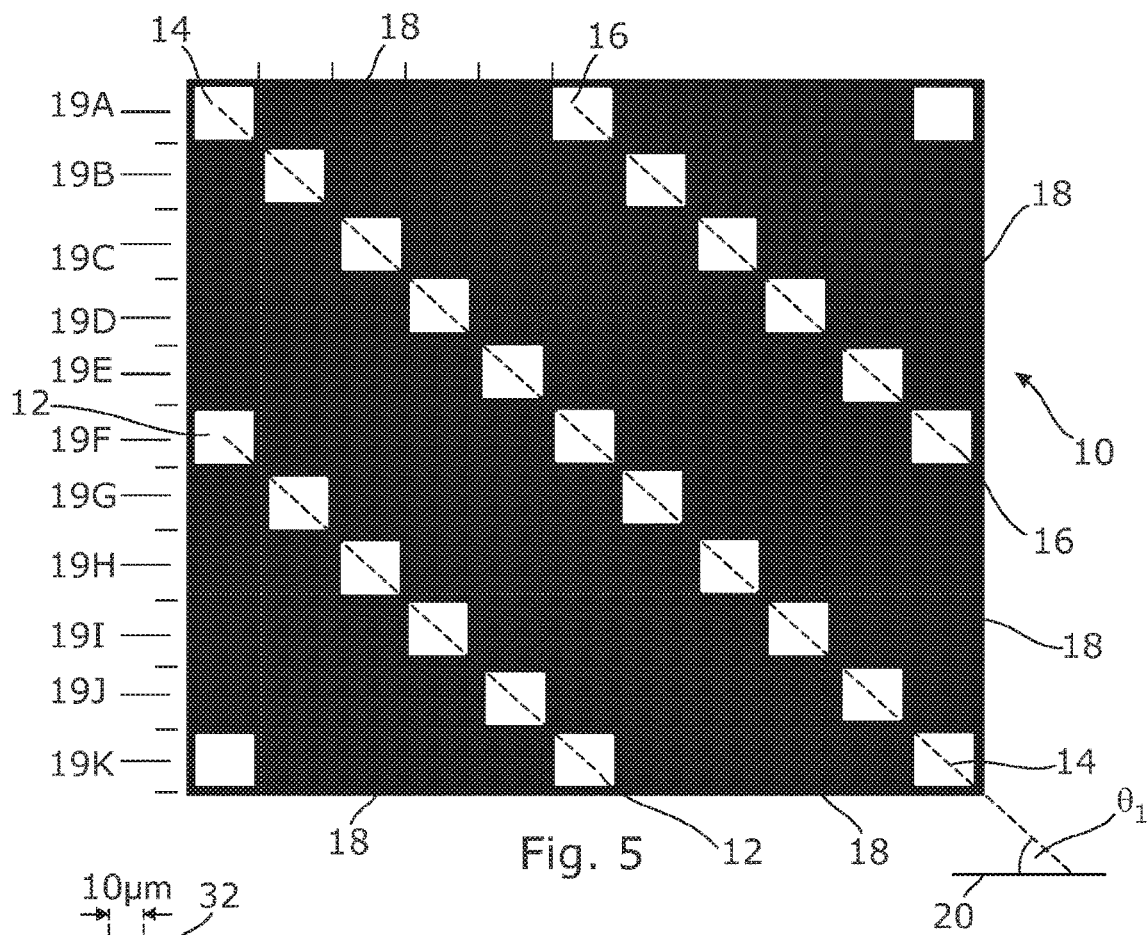
FIG. 5 shows an enlarged area, 11×11 pixels square, of the surface pattern pixel matrix of FIG. 1.

Referring firstly to FIGS. 1 and 5, there is shown a surface pattern pixel matrix 10 in which diagonally orientated rows of individual white "off" pixels 12, 14, 16 are provided in an otherwise solid area of black "on" pixels, as can be seen more clearly and enlarged in FIG. 5.

As will already be apparent from the foregoing, the patterns shown in the various figures can exist both virtually in the digital domain, e.g. within the 1-bit TIF files created as a result of the various RIPs applied to a single (CMYK or other) color separation of an original artwork image (not shown), and in the physical domain, e.g. as surface patterns appearing on the uppermost surface of relief areas of printing plates manufactured using any of the various CtP or computer-to-film technologies currently well known and widely practiced. The white "off" pixels of the former translate directly and exactly to depressions and/or channels in the latter, whereas the black "on" pixels of the former translate to ink-bearing islands in the relief areas of the latter. Of course, the very reason for performing the screening techniques described, and for providing surface patterning in relief areas of printing plates, is that the provision of channels and other pits or depressions in such relief areas results in improved overall ink transfer characteristics of the printing plate, particularly in areas of that plate which would otherwise be solid. Therefore, it is believed that, although the primary ink-bearing surfaces of such relief areas will be substantially provided by the uppermost surfaces of the islands, there will inevitably be some ink flow, distribution and dispersion within the channels, pits and depressions which surround said islands, and therefore they can also be considered as ink-bearing to some degree. That said, in general the islands predominate, and therefore it is considered herein that the channels, pits, depressions and the like which constitute the surface pattern and surround the islands function more as an assistive mechanism whereby the overall meniscus of ink borne predominantly by the uppermost surface of the islands is reduced (i.e. it becomes flatter), and therefore ink transfer characteristics are generally improved. The term "ink-bearing" as appearing herein should be interpreted accordingly, and as context dictates.

In FIG. 5, it can be seen that, as the pixels are essentially square, the diagonal angle $\theta_1$, being that angle subtended between a lateral line 20 drawn from right to left and parallel with the direction of any row 19A, B, C, D, E, F, G, H, I, J, K of pixels must be 45°. It is also to be noted from FIG. 5 that top-left vertex of any one of the "off" pixels is immediately adjacent the bottom-right vertex of the "off" pixel in the previous row, as a result of the offset increment of 1 pixel per row. Although much more complicated surface pattern pixel matrixes are possible with DM screening, this pattern is useful for the purposes of explaining the present invention because of its simplicity, and also because it provides clear diagonally orientated lines of "off" pixels representing a channel in the finished plate between which are defined similarly diagonally orientated, significantly wider lines of "on" pixels, representing solid diagonally orientated islands in the finished plate.

It can also be seen from FIG. 5 that along any single row of pixels 19A-19K, the lateral separation of consecutive white "off" pixels is pixels. The importance of this lateral separation will be explained in greater detail below.

Figure 2:
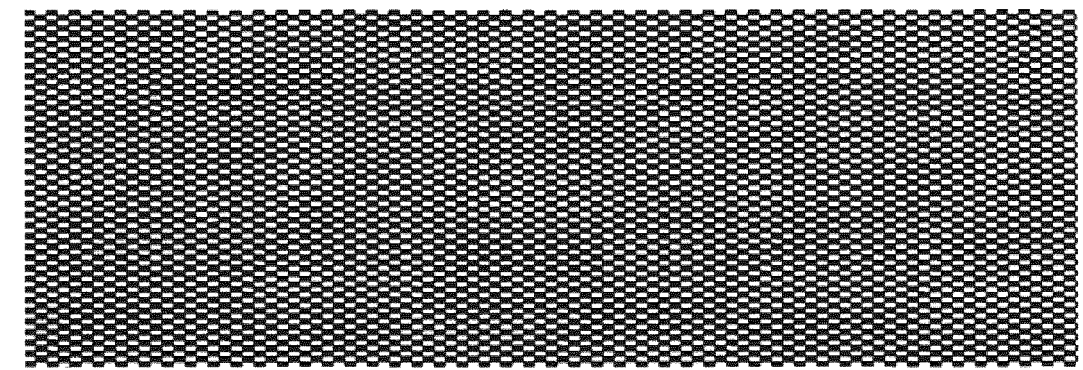
FIG. 2 shows an example of a known stretched chequerboard surface pattern pixel matrix.
Figure 4A:
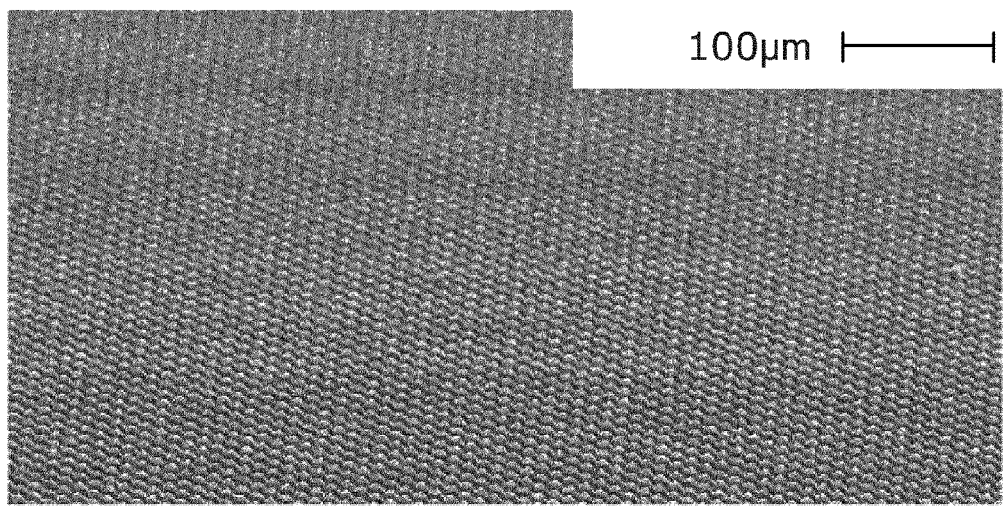
FIGS. 4A-4C represent scanning electron microscope (SEM) images at various magnifications of an ink-bearing printing plate relief surface to which the known stretched chequerboard surface pattern (but not any other pattern) has been applied.
Figure 4B:
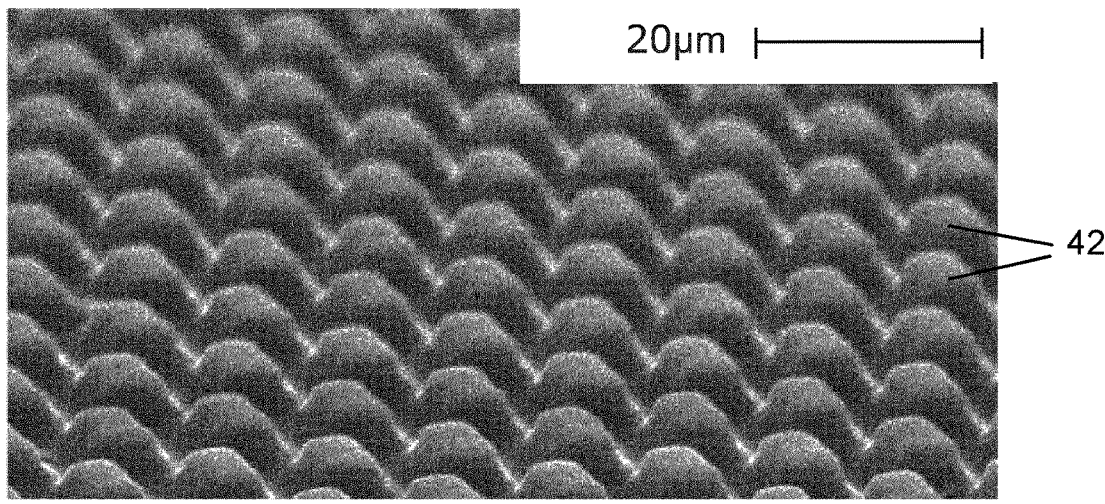
Figure 4C:
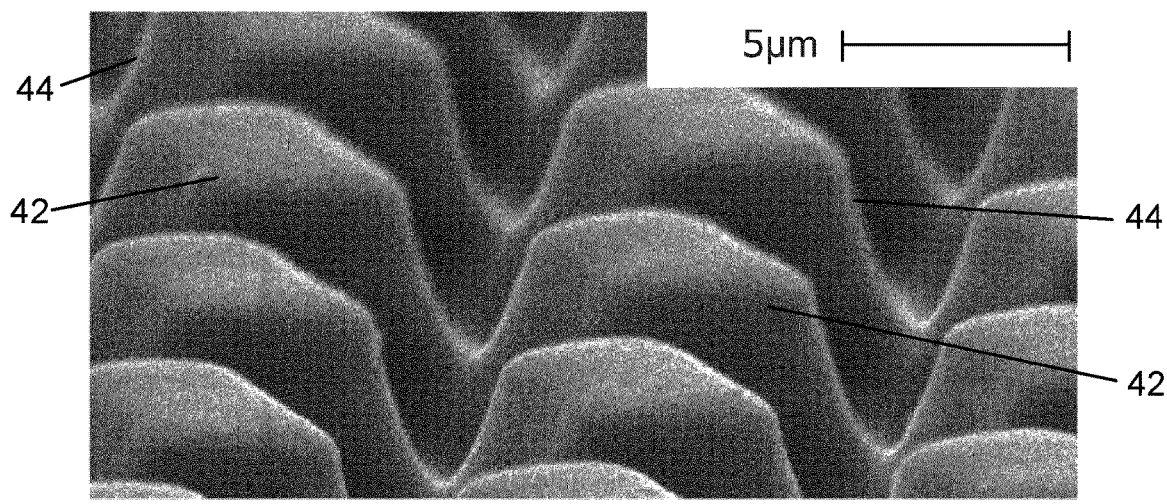
Figure 6:
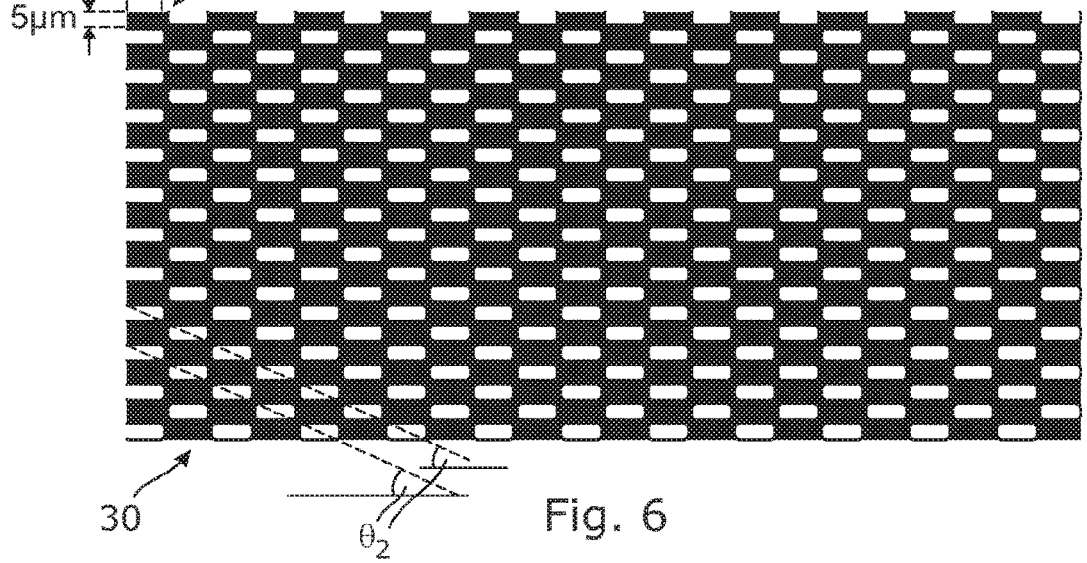
FIG. 6 shows an enlarged area of the surface pattern pixel matrix of FIG. 2.

Referring now to FIGS. 2 and 6, the latter being merely an enlarged version of the former, the known stretched checkerboard surface cell pattern pixel matrix 30 is shown, and consists simply of a laterally stretched checkerboard pattern of alternating "on" and "off" pixels. To provide some idea of scale, individual pixels in the matrix are rectangles having longer sides of 10 µm and shorter sides of 5 µm, as shown at 32. In FIGS. 4A, 4B and 4C, the patterned surface which results from applying this pattern matrix to an otherwise solid or substantially solid plate area can be seen. In FIGS. 4B and 4C in particular, it can be seen that the individual ink-bearing islands 42 have a cross-sectional shape which is slightly different from the perfect rectangle appearing in the pattern pixel matrix of FIGS. 2 and 6. Furthermore, the shape of the depressions and the channels they form is also to be noted—those skilled in the art will understand these discrepancies because the pattern of FIGS. 2 and 6 is applied purely digitally to a screen separation which is in turn formed into a film negative mask having opaque and translucent regions, the latter allow transmission of curing radiation into the otherwise unstable printing plate. As would be expected, there is some dispersion of radiation through the radiation-permissive regions of the mask, and therefore the islands 42 all have inclined shoulders 44, such shoulders of adjacent islands meeting at some point well beneath the uppermost surfaces of the islands as a result of the uncured polymer of the plate being washed away by solvent, as previously described. Also, any chemical erosion process is most unlikely ever to be as precise as the purely digital representation, and therefore discrepancies in shape and size inevitably arise. Finally, it is also worth noticing from FIG. 4C that the uppermost surfaces of the islands 42 perhaps constitute only a minority of the overall area, with the area of the intervening depressions, pits and/or channels predominating. Although this surface pattern does undoubtedly improve ink transfer characteristics of solid areas of a printing plate, tail-edge void, reticulation and fluting deficiencies are still apparent in the printed substrate material.

Also in FIG. 6 particularly, it is to be noted that the pixels are distinctly more elongate than the substantially square pixels appearing in FIGS. 1 and 5, being rectangular in shape and having a depth or shorter side which is exactly (or in certain embodiments, approximately) half that of the corresponding "off" pixels in FIGS. 1 and 5, but having a longer side which is exactly or approximately equal to the length of a side of a corresponding "off" pixel in FIGS. 1 and 5. This relationship is important in two respects. Firstly, it results in each of the diagonal rows of "off" pixels in the pattern of FIGS. 2 & 6 having a much shallower screen angle $\theta_2$ as shown. Secondly, it usefully allows for short (in this embodiment, 4) diagonal pixel arrays to be inserted within the larger diagonal rows 18 of "off" pixels of FIGS. 1 and 5 without compromising the integrity of any particular pixel, i.e. no individual "off" pixel is disposed horizontally or vertically adjacent any other—any pixel adjacency is purely diagonal, and therefore the diagonal integrity of the pattern is retained, as will be more fully explained below. Interestingly, the DM screening techniques covered in U.S. Pat. No. 8,654,400 & U.S. Pat. No. 8,654,401 abovementioned specifically seek to eliminate diagonal pixel adjacency as it is considered in those documents that diagonally adjacent pixels promote dot gain much more than horizontally or vertically adjacent pixels, i.e. where pixel lie adjacent along all or most one of their sides, as opposed to their vertices. By contrast, the present invention utilizes diagonal pixel adjacency to great benefit.

Figure 3:
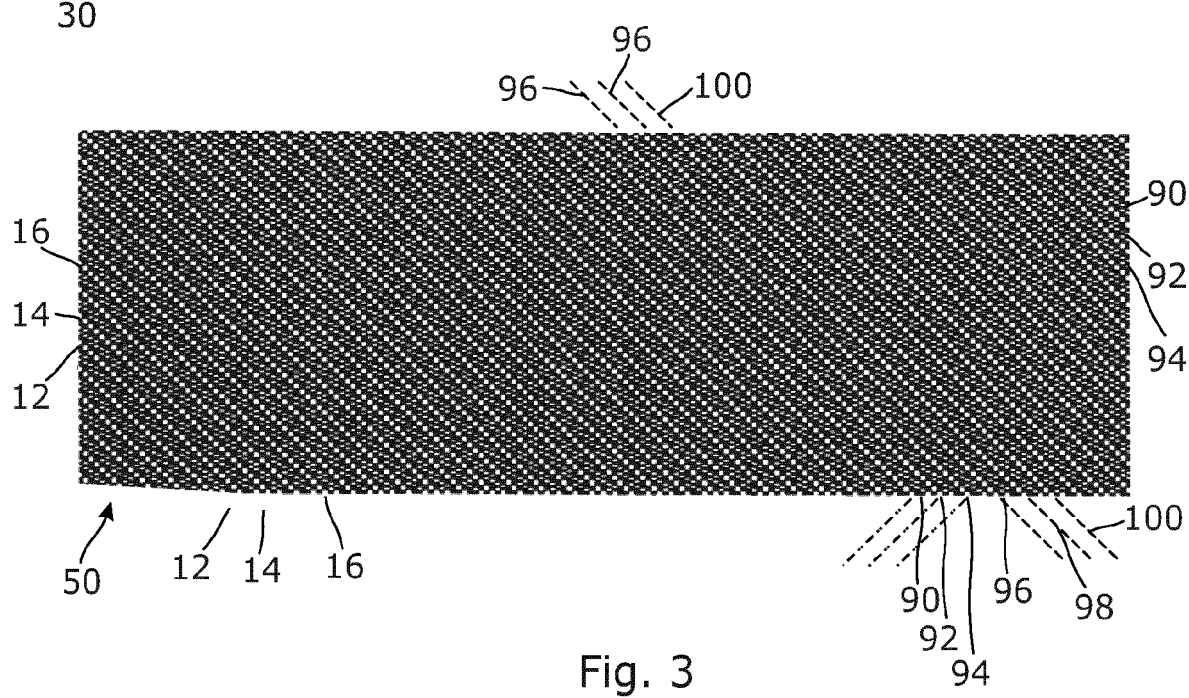
FIG. 3 shows one example of a surface pattern pixel matrix according to the present invention which results from selectively applying the surface pattern pixel matrix of FIG. 2 to that of FIG. 1 so as to effectively combine them, at least partially.
Figure 8:
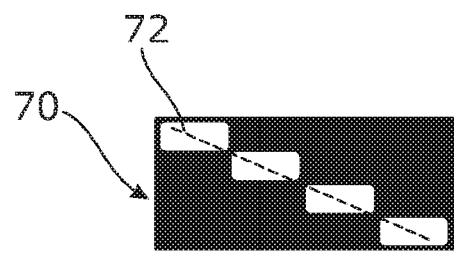
FIG. 8 shows the 4×4 pixel matrix element of FIG. 7 in which all white "off" pixels are turned "on" (black) except for pixels being on the main top-left to bottom-right diagonal of the pixel element.
Figure 9:
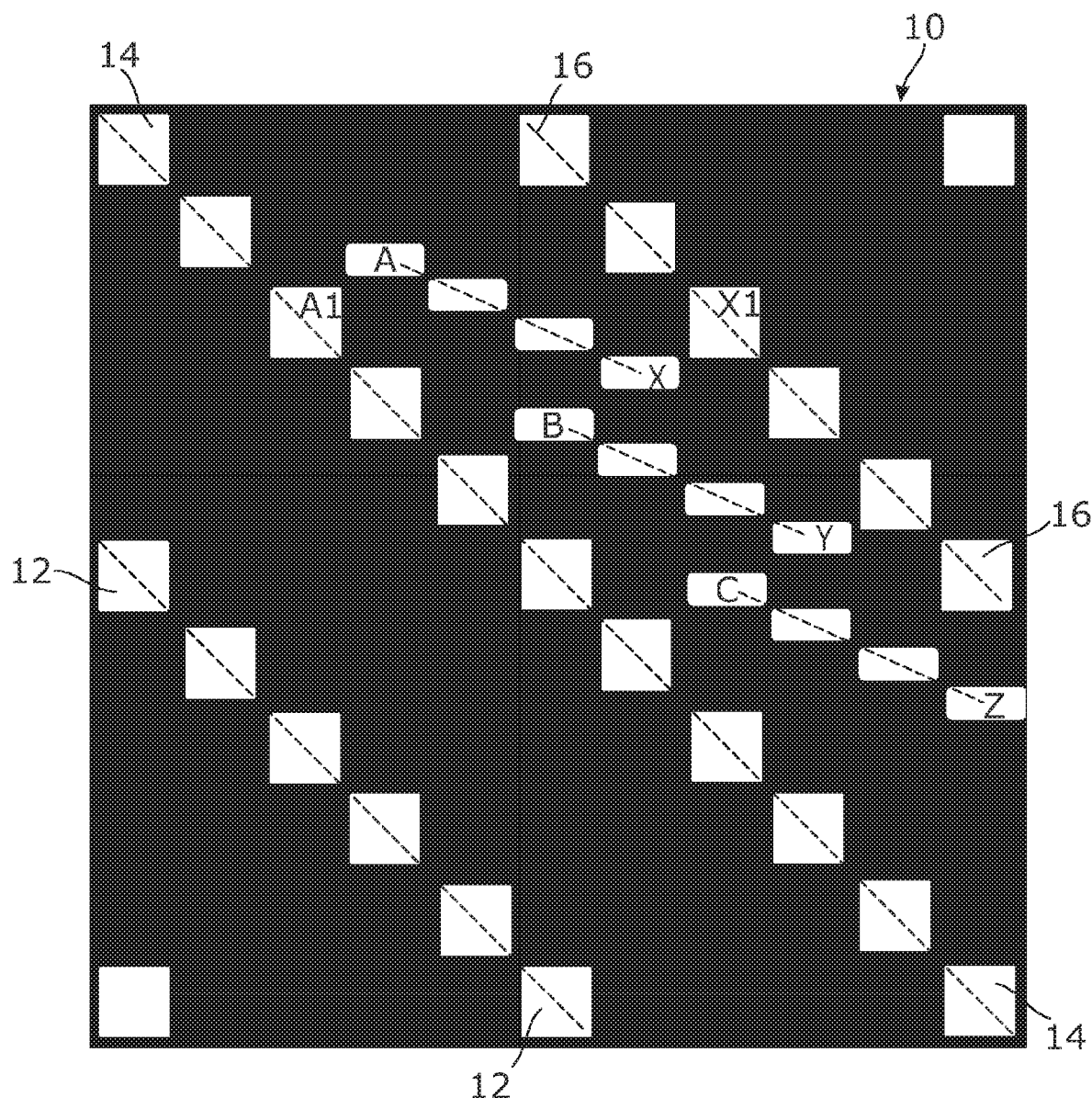
FIG. 9 shows how the element of FIG. 8 may be repeatedly applied between a pair of consecutive diagonal rows of the pixel matrix of FIG. 1, or as enlarged in FIG. 5.
Figure 10:
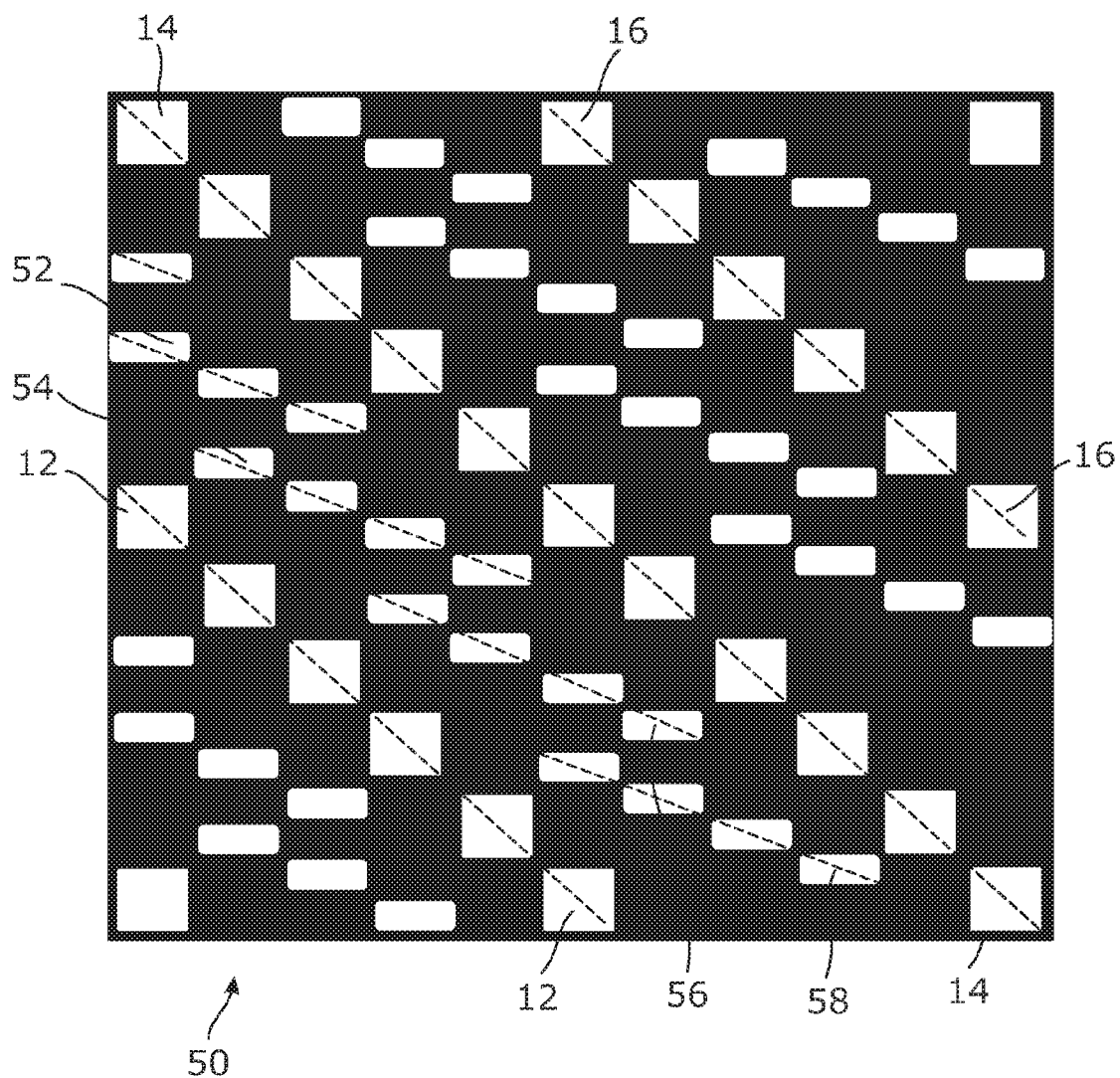
FIG. 10 shows an enlarged 11×11 square pixel element of the surface pattern pixel matrix of FIG. 3 to which the surface pattern pixel matrix of FIG. 2 has been completely selectively applied.

Referring to FIGS. 3, 7, 8, 9, 10, a modified surface pattern pixel matrix is shown at 50 which results from the selective, i.e. not total, application of the matrix of FIG. 2 to the matrix of FIG. 1. From both FIGS. 3 and 10, the latter being merely an enlarged version of the former, the diagonal rows of white "off" pixels of the first pattern of FIG. 1 can still clearly be seen at 12, 14, 16. However, in FIG. 10 in particular, shortened diagonal arrays 52, 54, 56 58 consisting of only 4 pixels of reduced size as compared to the "off" pixels within the rows 12, 14, 16 can also be seen. The relationship between the sizes of pixels appearing in the patterns of FIGS. 1 and 5 and those appearing in the patterns of FIGS. 2 and 6 is such that multiple individual shortened diagonal arrays of "off" pixels, such as clearly seen at 70, 72 in FIG. 8, can be effectively inserted between and within two consecutive diagonally orientated rows, e.g. 12, 14, of diagonally adjacent "off" pixels of the patterns of FIGS. 1 and 5 in such a manner that the terminal vertices of terminal pixels in the small array of pixels are disposed adjacent corresponding vertices of the larger "off" pixels appearing in said rows 12, 14. It is important to note that the diagonal uniformity of the resulting pattern in FIGS. 3, 10 is retained—pixels of the pattern of FIGS. 1 and 5 are adjacent pixels of the pattern of FIGS. 2 and 6 only at their vertices, and there is no adjacency of the sides of pixels of either pattern anywhere in the resulting pattern of FIGS. 3 and 10.

Figure 7:
FIG. 7 shows a rectangular 4×4 pixel element extracted from the pixel matrix of FIG. 2 or 6.

In FIG. 7, a small 4×4 elongated pixel array (being simply a 4×4 sized grid extracted from FIG. 6) is shown at 60. In this array, there are naturally an equal and even number of both "on" and "off" pixels. To demonstrate how the pattern of FIGS. 2 and 6 is selectively applied to the pattern of FIGS. 1 and 5, a modified 4×4 array of pixels 70 is shown in FIG. 8 in which only the "off" pixels along the major diagonal of the 4×4 array are retained, all others being switched "on".

In FIG. 9, it can be seen how the diagonally orientated row (72 in FIG. 8) of "off" 4 pixels contained within the 4×4 array 70 of FIG. 8 can be repeatedly inserted into the pattern 10 of FIGS. 1 & 5. In FIG. 9, the array 72 has been inserted 3 times, with the initial and terminal pixels in each array being labelled A, X, B, Y, and C, Z respectively for each of the three insertions. Note that for the particular pixel array A-X:

bottom-right vertex of pixel A lies diagonally adjacent top-right vertex of corresponding larger pixel A1 contained within the original pattern of FIGS. 1 and 5, top-right vertex of pixel X lies diagonally adjacent bottom-left vertex of corresponding larger pixel X1 contained within the original pattern, and both pixels A1 and X1 of the original pattern lie the same row.

Thus, by selectively applying the pixel matrix of FIGS. 2 & 6 to that of FIGS. 1 & 6, it is possible to provide a pixel matrix which is not only entirely diagonally consistent in that no side of any "off" pixel of either pattern is adjacent and/or shared, but one which incorporates two distinct and different angles of "off" pixels, so-called screen angles. A yet further advantage of the present invention, and one can be appreciated more readily when FIG. 3 is viewed from a distance, is attributable to the effect that the diagonally orientated rows of "off" pixels in the pixel matrices of FIGS. 3 and 10 have on the remaining "on" pixels, such "on" pixels of course being directly correlated to the islands formed in the resulting manufacture printing plate. Firstly, there are now (at least) two sets of clearly defined distinct diagonally orientated rows of "on" pixels, a first of which are reference in FIG. 3 at 90, 92, 94, (interestingly at a notional screen angle of 90+θ$_2$) and a second set referenced at 96, 98, 100, at a notional screen angle of θ$_1$. As the skilled reader will be acutely aware, screen angles are commonly perceived as critical in printing, and it is believed that by employing the present invention to provide multiple screen angles in a single surface cell pattern, evenness of ink lay-down is markedly improved. Secondly, with particular reference to FIG. 10, it can be seen that there is a repeating diagonal pattern (between any two of diagonal rows 12, 14, 16 of "off" pixels) of 2 pixel wide blocks of "on" pixels within which said "on" pixels are grouped together either singly, doubly or triply, which the single "on" pixels being diagonally arranged with respect to one another and effectively joining the larger triply grouped "on" pixels at either side of the block. Thus again, a particularly unusual and unexpected result (that of obtaining three different pixel group sizes) has been achieved by combining two essentially simple patterns, and again, in the resulting manufactured printing plate, the islands of different sizes thus formed are believed to bear, retain, and transfer ink to a substrate much more efficiently than previously thought possible.

The invention claimed is:

1. A printing plate comprising:
    a plurality of relief areas which stand proud of a floor of the plate, each of said relief areas having an uppermost surface to which, in use, is applied a liquid which is borne by said uppermost surface and subsequently contactingly transferred to a substrate material, the uppermost surface of one or more of said relief areas being pitted in that substantially the entire uppermost surface of said relief area is provided with a predetermined pattern of depressions which define a corresponding pattern of islands within said uppermost surface,
    wherein the predetermined pattern of depressions within the uppermost surface comprise at least primary depressions of a first size and geometric first cross-sectional shape, and secondary depressions, being of smaller cross-sectional area than said primary depressions and having a second cross-sectional shape which is distinctly more elongate than said geometric first cross-sectional shape, and
    wherein the primary depressions are arranged diagonally with respect to one another and in continuous rows having a lateral separation which is at least three times a lateral dimension of the geometric first cross-sectional shape, said secondary depressions also being arranged diagonally with respect to one another and in rows, but the rows of the secondary depressions are orientated at a different diagonal angle to those of the primary depressions and are discrete in that their terminal depressions lie within consecutive rows of the primary depressions so as to define a corresponding pattern of islands of different sizes and diagonal orientations.

2. A printing plate according to claim 1, wherein the geometric first and second cross-sectional shapes of either or both the primary and secondary depressions are one of: regular polygons, substantially quadrangular, rectangular and diamond-shaped.

3. A printing plate according to claim 1, wherein the geometric first and second cross-sectional shapes of the primary depressions is one of: square, and diamond-shaped, said diamond-shape having at least one axis of symmetry, and the second cross-sectional shape of the secondary depressions is one of: rectangular with the elongate side of such rectangle being of the same dimension as a corresponding side of one of the primary depressions, and of a diamond-shape wherein at least one of a major and minor axes of a shape is different from a corresponding axis of a diamond-shaped primary depression.

4. A printing plate according to claim 1, wherein the primary depressions cross-sectional shape is one of: circular, and elliptical, and the secondary depression shape is one of: elliptical, and elliptical with a major/minor axis differential as compared with an elliptical primary depression shape.

5. A printing plate according to claim 1, wherein the geometric first cross-sectional shape of a primary depression is a square having sides in the region of 10 μm, and the second cross-sectional shape of the secondary depression is rectangular with side dimensions in the region of 10 μm×5 μm.

6. A printing plate according to claim 1, wherein the geometric first and second cross-sectional shapes of the primary and secondary depressions have the same number of sides.

7. A printing plate according to claim 6, wherein one, or both of a lateral and transverse dimension of the geometric first and second cross-sectional shapes of primary and secondary depressions are mathematically related.

8. A printing plate according to claim 7, wherein lateral dimensions of both primary and secondary depressions cross-sectional shapes are equal, whereas the transverse dimension of a primary depression is (1+X) times the corresponding transverse dimension of a secondary depression, with X being in one of the following ranges: $0.2<=X<=3$, and $0.5<=X<=2$.

9. A printing plate according to claim 1, in which surface cell patterning has been applied only to relief areas adapted to apply ink at tonal values above a threshold value, said threshold value being one of: 50%, 70%, 90%.

10. A printing plate according to claim 1, wherein surface cell patterning has been applied to such relief areas which, in isolation, have a measured area which is larger than a threshold value based on an overall plate image area, said threshold value being one of: 5, 10, 15, or 20% of total plate image area.

11. A printing plate according to claim 1, manufactured using a 1-bit TIF image raster formed by performing two distinct raster image processing (RIP) steps, a first RIP step being a DM screening RIP applied to at least one solid color image area of any CMYK or other color screen separation image so as to provide an image with a first pixelated pattern including a plurality of diagonally orientated rows of offset "off" pixels, and a second RIP step being a RIP selectively applied only to remaining "on" pixels in at least said solid color image area after completion of the first RIP step and wherein the second RIP step applies a second pixelated pattern including a plurality of diagonally oriented rows of offset "off" pixels, and wherein the diagonal orientations of the plurality of diagonally oriented rows of offset "off" pixels produced by first and second RIPs are different.

12. An image processing method for creating a digital image used in the manufacture of a printing plate according to claim 1, said image processing method including the steps of:
- decomposing an original digital image into one or more digital screen images;
- identifying areas of any one of the digital screen images, according to tonality, physical printing of which by said printing plate would be improved by providing surface cell patterning in corresponding areas of said printing plate;
- performing a first digitally modulated (DM) screening raster image processing (RIP) applied to at least one of said identified areas so as to provide said digital screen image screen with a first pixelated pattern including a plurality of diagonally orientated rows of offset "off" pixels; and
- performing a second RIP selectively to the remaining "on" pixels in said identified areas after completion of a first RIP step and wherein a second RIP step applies a second pixelated pattern including a plurality of diagonally oriented rows of offset "off" pixels wherein the diagonal orientations of the offset "off" pixels produced by said first and second RIPs are different.

13. An image processing method according to claim 12, wherein the digital image created is a 1-bit tagged image format (TIF) raster image.

14. An image processing method according to claim 12, wherein the primary depressions geometric first and second cross-sectional shape is one of: circular, and elliptical, and the secondary depression shape is one of: elliptical, and elliptical with a major/minor axis differential as compared with the elliptical primary depression shape.

15. An image processing method according to claim 12, wherein a cross-sectional shape of a primary depression is a square having sides in a region of 10 μm, and a cross-sectional shape of a secondary depression is rectangular with side dimensions in a region of 10 μm×5 μm.

16. An image processing method according to claim 12, wherein the geometric first and second cross-sectional shapes of primary and secondary depressions have the same number of sides.

17. An image processing method for creating a digital image used in the manufacture of a printing plate according to claim 1, said image processing method including the steps of:
- decomposing an original digital image into one or more digital screen images;
- identifying areas of any one of the digital screen images, according to tonality, physical printing of which by said printing plate would be improved by providing surface cell patterning in corresponding areas of said printing plate; and
- digitally applying a mask to at least one of said identified areas so as to provide said digital screen image screen with a pixelated pattern comprising a first plurality of diagonally orientated rows of offset "off" pixels and a second plurality of diagonally orientated rows of offset "off" pixels in an intervening space between the first plurality of diagonally orientated rows of offset "off" pixels wherein diagonal orientations of the first plurality of diagonally orientated rows of offset "off" pixels and the second plurality of diagonally orientated rows of offset "off" pixels are different.

18. An image processing method according to claim 17, wherein the primary depressions geometric first and second cross-sectional shape is one of: circular, and elliptical, and the secondary depression shape is one of: elliptical, and elliptical with a major/minor axis differential as compared with an elliptical primary depression shape.

19. An image processing method according to claim 17, wherein the geometric first and second cross-sectional shape of primary depressions is a square having sides in a region of 10 μm, and the second cross-sectional shape of the secondary depressions is rectangular with side dimensions in a region of 10 μm×5 μm.

20. An image processing method according to claim 17, wherein the geometric first and second cross-sectional shapes of the primary and secondary depressions have the same number of sides.

* * * * *